(12) United States Patent
O'Brien et al.

(10) Patent No.: US 12,491,118 B2
(45) Date of Patent: Dec. 9, 2025

(54) ABSORBENT WOUND DRESSING

(71) Applicant: MEDTRADE PRODUCTS LIMITED, Crewe (GB)

(72) Inventors: Mark O'Brien, Crewe (GB); Jennifer Haynes, Crewe (GB); Neil Johnson, Crewe (GB); Thomas Lane, Crewe (GB); Nicola Deeley, Crewe (GB)

(73) Assignee: MEDTRADE PRODUCTS LIMITED, Crewe (GB)

( * ) Notice: Subject to any disclaimer, the term of this patent is extended or adjusted under 35 U.S.C. 154(b) by 470 days.

(21) Appl. No.: 17/923,545

(22) PCT Filed: May 4, 2021

(86) PCT No.: PCT/GB2021/051064
§ 371 (c)(1),
(2) Date: Nov. 4, 2022

(87) PCT Pub. No.: WO2021/224602
PCT Pub. Date: Nov. 11, 2021

(65) Prior Publication Data
US 2023/0190529 A1 Jun. 22, 2023

(30) Foreign Application Priority Data

May 4, 2020 (GB) ..................................... 2006588

(51) Int. Cl.
*A61F 13/01* (2024.01)
*A61F 13/0203* (2024.01)

(52) U.S. Cl.
CPC .. *A61F 13/01029* (2024.01); *A61F 13/01038* (2024.01); *A61F 13/0203* (2013.01)

(58) Field of Classification Search
CPC .......... A61F 13/01029; A61F 13/01038; A61F 13/0203; A61F 13/01; A61F 2013/00361;
(Continued)

(56) References Cited

U.S. PATENT DOCUMENTS 5,429,591 A 7/1995 Yamamoto et al.
5,973,221 A * 10/1999 Collyer ................... A61L 15/26
602/56
(Continued)

FOREIGN PATENT DOCUMENTS

EP 3915531 A1 * 12/2021 ............ A61M 1/985
WO 9503018 A1 2/1995
(Continued)

OTHER PUBLICATIONS

International Search Report and Written Opinion dated Aug. 12, 2021 for corresponding International Application No. PCT/GB2021/051064.

*Primary Examiner* — Tarla R Patel
(74) *Attorney, Agent, or Firm* — Tarolli, Sundheim, Covell & Tummino LLP

(57) ABSTRACT

The present invention concerns extensible absorbent wound dressings. The wound dressing has a wound contact layer having a proximal surface facing toward the wound and a distal surface facing away from the wound, and a backing layer having a proximal surface facing toward the wound and a distal surface facing away from the wound, the backing layer having an absorbent region located on a proximal surface thereof, the absorbent region comprising a plurality of discrete absorbent members, wherein the backing layer is configured to be positioned over the wound contact layer, such that the absorbent region is located adjacent to the distal surface of the wound contact layer, and wherein the absorbent region and the wound contact layer are configured to be detached at least in an area inside a perimeter of the absorbent region. The absorbent wound dressings of the present invention can be used to dress so-called truly three-dimensional anatomical areas, such as for example a knee or an elbow.

23 Claims, 8 Drawing Sheets

Figure 1:
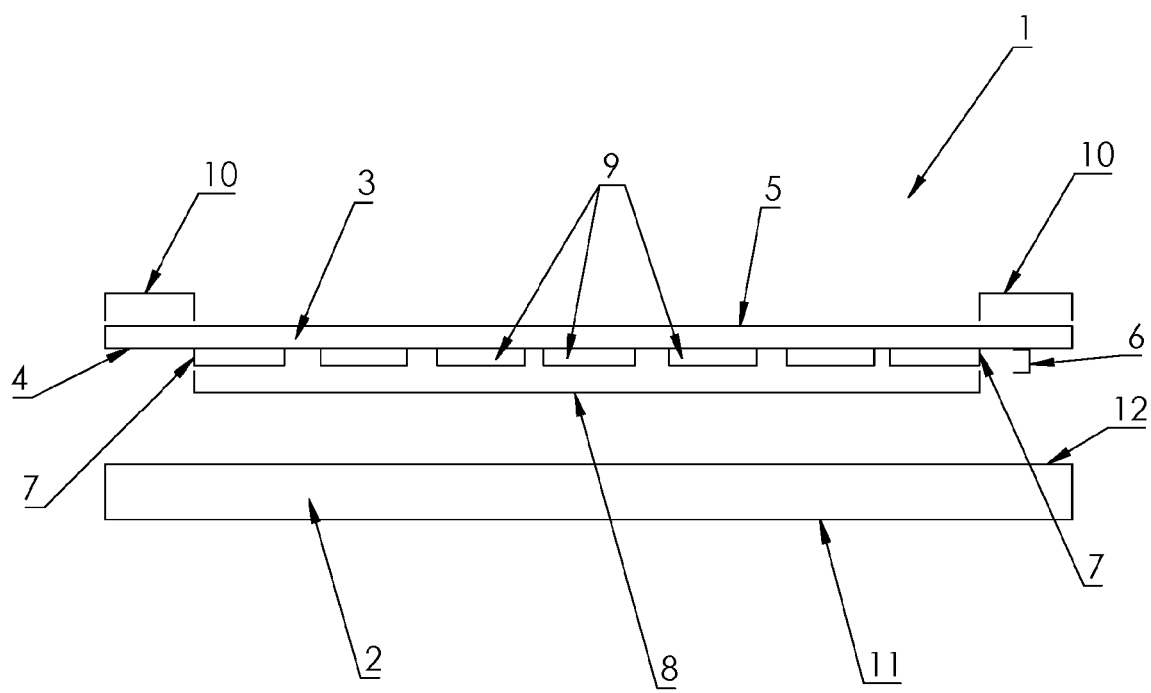

(58) Field of Classification Search
CPC ............ A61F 2013/00536; A61F 13/02; A61F 13/022; A61F 13/0243; A61F 2013/00765; A61F 2013/00778
See application file for complete search history.

(56) References Cited

U.S. PATENT DOCUMENTS

| | | | |
|---|---|---|---|
| 6,066,773 | A | 5/2000 | Freeman |
| 2019/0274889 | A1* | 9/2019 | Steward .............. A61F 13/0286 |
| 2020/0038251 | A1 | 2/2020 | Locke et al. |
| 2020/0093646 | A1 | 3/2020 | Locke et al. |
| 2020/0268560 | A1* | 8/2020 | Harrison ................ A61M 1/90 |
| 2021/0196525 | A1* | 7/2021 | Bishop ................ A61F 13/0203 |

FOREIGN PATENT DOCUMENTS

| | | | |
|---|---|---|---|
| WO | 0220067 | A2 | 3/2002 |
| WO | 2020003067 | A2 | 1/2020 |
| WO | 2020005535 | A1 | 1/2020 |

* cited by examiner

ABSORBENT WOUND DRESSING

RELATED APPLICATIONS

The present application is a U.S. National Stage application under 35 USC 371 of PCT Application Serial No. PCT/GB2021/051064, filed on 4 May 2021; which claims priority from GB Patent Application No. 2006588.4, filed 4 May 2020; the entirety of both of which are incorporated herein by reference.

TECHNICAL FIELD OF THE INVENTION

The present invention relates to absorbent wound dressings and, more particularly, to extensible absorbent wound dressings.

BACKGROUND TO THE INVENTION

Absorbent wound dressings that are used to manage exudate associated with acute, chronic and post-surgical wounds are increasingly being applied to anatomical areas of the human body that are considered to be difficult to dress. Examples of difficult to dress regions include knees, hips, sacrum, abdomen, feet and amputation sites.

Typically, such wound dressings manage wound exudate via an absorbent laminate component. Often these absorbent laminate components are the most rigid and least extensible parts of the construction. As such, they act as a rate limiting factor in the extensibility of the overall dressing. This lack of stretch and conformability can be burdensome for clinicians, especially when applying the absorbent wound dressings to the aforementioned difficult to dress anatomical areas. Once applied, the rigid wound dressings can also prematurely detach from the wound and/or skin surface as they cannot respond and conform to a patient's bodily movements. This is a particular disadvantage if it occurs before the wound dressing has reached full saturation capacity, as it can result in clinician dissatisfaction, since an increased number of dressing changes places a higher burden on their time. Additionally, unnecessary wound dressing changes significantly increase healthcare authority costs, both via purchasing of the wound dressings and disposal of clinical waste.

Wound dressing manufacturers have sought to address this clinical issue in different ways. For example, several wound dressings, in particular dressings designed for post-operative wounds, feature absorbent laminates comprising a slit or cut fenestration pattern. Examples of such dressings featuring a repeat fenestration pattern include Optifoam Gentle SA Post-Op, Ex. Medline Industries. The fenestration patterns yield improvements in extensibility in specific directions or vectors dependent on the nature of the repeating pattern. However, further improvements are still sought to allow clinicians to dress so-called truly three-dimensional anatomical areas, such as for example a knee or an elbow, and for the wound dressing to remain in place for multiple days under the rigours of a range of limb movements.

The present invention has been developed with the aforementioned problems in mind and seeks to overcome these or other disadvantages to provide an improved absorbent wound dressing.

SUMMARY OF THE INVENTION

According to a first aspect of the present invention, there is provided a wound dressing for application to a wound, comprising:

a wound contact layer having a proximal surface facing toward the wound and a distal surface facing away from the wound, and a backing layer having a proximal surface facing toward the wound and a distal surface facing away from the wound, the backing layer having an absorbent region located on a proximal surface thereof, the absorbent region comprising a plurality of discrete absorbent members, wherein the backing layer is configured to be positioned over the wound contact layer, such that the absorbent region is located adjacent to the distal surface of the wound contact layer, and wherein the absorbent region and the wound contact layer are configured to be detached at least in an area inside a perimeter of the absorbent region.

The wound contact layer may comprise a liquid-distribution region located on the distal surface thereof, such that the absorbent region is located adjacent to the liquid-distribution region. In such embodiments, the absorbent region and the liquid-distribution region are configured to be detached at least in an area inside a perimeter of the absorbent region.

The absorbent region may be attached to the wound contact layer or the liquid-distribution region at the perimeter of the absorbent region.

The backing layer may be attached to the wound contact layer or the liquid-distribution region in an area outside the perimeter of the absorbent region.

Therefore, in an embodiment of the invention there is provided a wound dressing for application to a wound, comprising:

a wound contact layer having a proximal surface facing toward the wound and a distal surface facing away from the wound, the wound contact layer having a liquid-distribution region located on the distal surface thereof, and a backing layer having a proximal surface facing toward the wound and a distal surface facing away from the wound, the backing layer having an absorbent region located on a proximal surface thereof, the absorbent region comprising a plurality of discrete absorbent members, wherein the backing layer is configured to be positioned over the wound contact layer, such that the absorbent region is located adjacent to the liquid-distribution region, and wherein the absorbent region and the liquid-distribution region are configured to be detached at least in an area inside a perimeter of the absorbent region.

The inventors have discovered that a wound dressing according to the present invention comprising an absorbent region comprising a plurality of discrete absorbent members that is adjacent to, but not attached to, a wound contact layer and/or a liquid-distribution region significantly increases the extensibility of the wound dressing. Beneficially, this enables the pad to conform to more difficult to dress anatomical areas of the body of a patient.

Surprisingly, the inventors discovered that the features of having the absorbent region and the wound contact layer and/or the liquid-distribution region detached in combination with the absorbent region comprising a plurality of discrete absorbent members appear to function synergistically to yield a highly extensible wound dressing. In tests, the extensibility of embodiments of the wound dressing of the present invention has been shown to be significantly increased by up to 291% compared to a dressing of the same materials, with a single continuous absorbent region coupled to a single continuous liquid-distribution region.

Whilst not wishing to be bound by theory, it is thought that the provision of a plurality of absorbent islands as opposed to a single piece of absorbent material significantly reduces the tensile strength of this layer, ensuring that its contribution to the extensibility of the overall dressing is significantly reduced. Furthermore, having the absorbent region located adjacent to, but not attached to, the wound contact layer and/or the liquid distribution region permits the layers to more easily move relative to each other during application of the dressing to a patient. In other words, the layers are permitted to pass over each other during extension of the wound dressing. This increases the extensibility of the wound dressing since it is generally the inflexible absorbent components which limit the extension of the dressing in one or more directions.

The wound dressing of the present invention reduces the effect that the absorbent and/or liquid-distribution regions have on the extensibility of the dressing, meaning that the extensibility of the dressing is predominantly determined by the extensibility of the backing layer and the wound contact layer, both of which are in themselves more flexible and extensible.

Accordingly, the wound dressing of the present invention has an improved multi-directional stretch. The dressing has an increased ability to extend in a 360° vector and is not hindered by the 'machine or cross-directional' nature of the materials used within the absorbent region of its construction. The wound dressing is also not dependent on the nature of any fenestration pattern located in one or more of its component parts.

A further advantage observed in certain embodiments of the present invention is an increase in its moisture vapour transmission rate (MVTR). The term "moisture vapour transmission rate" or "MVTR" is used herein to refer to the measurement of the passage of water vapour through a substance, typically measured in units of $g/cm^2$ over time.

In such embodiments, the gaps that form between each discrete absorbent member are of sufficient width to permit the transmission of fluid, including air and water vapour, through the structure of the wound dressing. Beneficially, this increases the wound dressing's ability to facilitate transpiration through the backing layer.

The wound dressing of the present invention can be utilised in situations where additional stretch and extensibility of the dressing is required. This will assist clinicians in applying the dressing to difficult to dress anatomical areas. The additional extensibility will also yield anthropometric benefits, permitting an additional range of motion for patients resulting from a dressing that conforms and stretches to mirror patient movements. Moreover, wound dressings of the present invention will remain in place for longer, thus reducing the burden on clinicians' time as a result of fewer dressing changes. This yields economic savings and provides a lower environmental burden through a reduction in disposable clinical waste.

The proximal surface of the backing layer may extend beyond the perimeter of the absorbent region to define a first border region. In such embodiments, the first border region provides an area outside the perimeter of the absorbent region for attachment to the wound contact layer or the liquid-distribution region, wherein the area inside the perimeter of the absorbent region is not attached to the wound contact layer or the liquid-distribution region.

The backing layer may be attached to the wound contact layer or the liquid-distribution region in the first border region.

Preferably, the proximal surface of the backing layer extends beyond the perimeter of the absorbent region to define a first border region and the distal surface of the wound contact layer extends beyond a perimeter of the liquid-distribution region to define a second border region, wherein the backing layer is attached to the wound contact layer in at least a portion of the respective first and second border regions.

Therefore, according to a further aspect of the present invention, there is provided a wound dressing for application to a wound comprising:

a backing layer having a proximal surface facing toward the wound and a distal surface facing away from the wound, the backing layer having an absorbent region located on the proximal surface thereof, the absorbent region comprising a plurality of discrete absorbent members, wherein the proximal surface of the backing layer extends beyond a perimeter of the absorbent region to define a first border region; and a wound contact layer having a proximal surface facing toward the wound and a distal surface facing away from the wound, the wound contact layer having a liquid-distribution region located on the distal surface thereof, wherein the distal surface of the wound contact layer extends beyond a perimeter of the liquid-distribution region to define a second border region, wherein the backing layer is attached to the wound contact layer in at least a portion of the respective first and second border regions such that the absorbent region is adjacent to the liquid-distribution region, and wherein the absorbent region and the liquid-distribution region are detached in the area inside the perimeter of the absorbent region.

The term 'wound' is used herein to refer to any breach or opening in the skin or subcutaneous tissue at a physiological target site of a human or animal. Typically, the wound dressing of the present invention is applicable to a physiological target site of a human. The term physiological target site may also be referred to herein as a wound site. The dressing is suitable for application to a variety of wounds. These may include acute wounds, chronic wounds such as pressure ulcers and diabetic foot ulcers, and post-surgical wounds.

The terms 'proximal' and 'distal' are used relative to a wound site. For example, the term 'proximal surface' is used herein to refer to a surface of a component of the dressing that, in use, faces toward the wound site and the term 'distal surface' is used herein to refer to a surface of a component of the dressing that, in use, faces away from the wound site. Similarly, a 'proximal layer' can be used to refer to a layer that is located towards the wound and a 'distal layer' can be used to refer to a layer that is located away from the wound.

The term 'adjacent to' is used herein to refer to component parts of the wound dressing that are next to each other, but it does not preclude there being one or more additional component parts located between the component parts described as being adjacent to each other. The term 'directly adjacent to' is used herein to refer to component parts of the wound dressing that are next to each other without any further components being located therebetween.

The wound dressing is intended to be applied to any wound which would benefit from a wound dressing having increased extensibility. As such, it is not limited to a particular size or shape. Typically, the wound dressing has a generally rectangular shape and preferably a square shape.

The dressing is particularly suitable for application to difficult to dress anatomical areas, being areas of the body to which a wound dressing cannot easily be applied. This may be due to specific contours of the body or due to the increased movement in and around the area during day to day activity and bodily movement. Difficult to dress areas may include, for example, knees, hips, sacrum, abdomen, feet and amputation sites.

The wound dressing may be placed in direct or indirect contact with the wound. The wound contact layer may directly contact the wound.

Reference herein to liquid or liquids includes water, wound exudate, including blood, plasma, and the like. Reference herein to fluid includes liquids as well as gases, such as air and water vapour.

The absorbent region is present in the wound dressing to absorb wound exudate.

The absorbent region may be located directly adjacent to the distal surface of the wound contact layer.

The absorbent region may be located directly adjacent to the liquid-distribution region.

The absorbent region may be an integral part of the backing layer. Preferably, however, the absorbent region is not an integral part of the backing layer, but is separate to it. In such embodiments, the absorbent region may be attached to the proximal surface of the backing layer.

The absorbent region may be located centrally on the proximal surface of the backing layer.

The proximal surface of the backing layer may extend beyond the periphery of the absorbent region in one or more directions. Typically, the proximal surface of the backing layer extends beyond the periphery of the absorbent region in all directions, such that the first border region surrounds the absorbent region.

The absorbent region may have a perimeter that is shorter than, longer than, or substantially the same as, the perimeter of the liquid-distribution region. Preferably, the absorbent region has a perimeter that is substantially the same length as the liquid-distribution region. The absorbent region may be substantially the same size as the liquid-distribution region.

The absorbent region is not limited to a particular shape. The absorbent region may take a variety of shapes as desired or as appropriate. Typically, the absorbent region has a generally rectangular shape. More preferably, the absorbent region has a generally square shape.

The absorbent region comprises a plurality of discrete absorbent members. The absorbent region may consist of a plurality of discrete absorbent members.

Each discrete absorbent member may form an island on the proximal surface of the backing layer. Accordingly, the plurality of discrete absorbent members may correspond to a plurality of absorbent islands.

The absorbent members may be arranged in an ordered or random configuration. Preferably, the absorbent members are arranged in an ordered configuration.

The absorbent members may be arranged in one or more directions. The absorbent members may be arranged in a repeating pattern. The repeating pattern may be linear or staggered.

The absorbent members may be substantially evenly spaced apart.

The absorbent members may be separated by a distance of from 0.01-5 mm. The absorbent members may be separated by a distance of from 0.1-0.5 mm. Good results have been observed when the absorbent members are separated by a distance of 0.1-0.5 mm. The absorbent region may comprise a mosaic of absorbent members.

In a preferred embodiment, the absorbent members are separated by a distance of 0.1-0.2 mm.

In alternative embodiments, the separation between adjacent absorbent members may be at least 1 mm. In such embodiments, the separation between adjacent absorbent members forms channels in the absorbent region. These channels permit the additional transmission of fluid through the structure of the dressing. Moreover, the channels increase the amount of fluid, including air and water vapour, in contact with the backing layer. Beneficially, this increases the transpiration volume of exudate relative to a continuous layer of absorbent material. As such, in turn, the wound dressing of the present invention has a higher moisture vapour transmission rate when compared to a continuous layer of absorbent material.

The absorbent members are not limited to a particular size or shape. The absorbent members may take a variety of shapes and sizes as desired or as appropriate.

The absorbent members may have different shapes. Preferably, the absorbent members all have the same shape.

The absorbent members may have a circular cross-section. The absorbent members may have a regular polygonal cross section. For example, the regular polygonal cross section may be triangular, square, rectangular, pentagonal, hexagonal, heptagonal, octagonal, nonagonal or decagonal. The absorbent members may be present in a combination of any two or more of the aforesaid cross-sectional shapes.

Preferably, each of the absorbent members has a substantially hexagonal cross section.

In a preferred embodiment of the invention, the absorbent members may be arranged in a honeycomb pattern.

A honeycomb pattern avoids any channels from running across the full width and/or length of the absorbent region. Beneficially, this reduces the speed at which fluid can escape from the absorbent region and into an area outside the perimeter of the absorbent region, such as the border region, and/or an area outside the dressing.

The absorbent members may each have a thickness of from 0.1-5 mm. Good results have been observed when the at least one absorbent member has a thickness of from 1-5 mm. In a preferred embodiment, the at least one absorbent member has a thickness of from 3-4 mm.

The number of absorbent members in the absorbent region of the wound dressing may vary depending on the size and nature of the dressing. Typically, the absorbent region may comprise at least five absorbent members, more preferably at least ten absorbent members, even more preferably at least twenty absorbent members.

The wound dressing may comprise a frame around the perimeter of the absorbent region. The perimeter of the absorbent region may comprise a frame. Such a frame may surround the absorbent members.

The frame may be secured to the proximal surface of the backing layer. Preferably, the frame is secured to the proximal surface of the backing layer using an adhesive.

The frame may be adhered to the wound contact layer and/or the liquid-distribution region. In such embodiments, the backing layer is attached to the wound contact layer or the liquid-distribution region via the frame, wherein the area inside the perimeter of the absorbent region is not attached to the wound contact layer or the liquid-distribution region.

The frame may be a variety of shapes or sizes as desired or as appropriate.

The frame may have a generally rectangular shape. Preferably, the frame has a generally square shape. Typically, the frame has substantially the same shape as the wound dressing.

The frame may have a width of from 0.1-10 mm. Good results have been observed when the frame has a width of from 1-3 mm. The frame may have a thickness of from 0.1-5 mm.

The frame is beneficial as it reduces the risk of liquid, such as wound exudate, leaking from the absorbent region to an area outside the perimeter of the absorbent region and, potentially, an area outside the wound dressing.

The absorbent members may have a laminate structure. The laminate structure may comprise two or more layers. The laminate structure may comprise two, three, four, five, six, seven, eight, nine, ten or more layers.

The absorbent members and/or the frame may comprise, or consist of, an absorbent material.

The absorbent material may itself comprise a laminate structure. The laminate structure may comprise one or more absorbent materials.

The term 'absorbent material' is used herein to refer to a physiologically acceptable material that is capable of absorbing liquid, such as wound exudate, and which is capable of absorbing liquid to greater than about 500% by weight of the absorbent material, and with a liquid retention of greater than about 40%. The absorbent material referred to herein may also be a superabsorbent material. Reference to an absorbent material also includes reference to a superabsorbent material unless expressed otherwise.

The absorbent material may comprise a fibrous, foam, non-woven or woven material.

The absorbent material may be in the form of fibres. Typically, the absorbent material is in the form of non-woven fibres. The length of the fibres can be up to about 100 mm, and is typically from about 20-75 mm, more typically from about 32 to 51 mm.

In some embodiments the absorbent material may be a superabsorbent material.

The term 'superabsorbent material' is used herein to refer to a hydrophilic material that is water-swellable, but not water soluble, and which is capable of absorbing liquid to greater than about 2000% by weight of the superabsorbent material, preferably greater than about 2500%, with a liquid retention of greater than about 85%, preferably greater than about 90%.

The superabsorbent material may be selected from polymeric materials such as poly(vinyl) alcohol (PVA), poly (ethylene oxide) (PEO) and poly(acrylic acid).

The superabsorbent material may be chemically modified. For example, the superabsorbent material may be a polymeric material obtained by graft polymerisation of acrylic acid onto a chain of carboxymethyl cellulose.

The superabsorbent material may comprise a chemically modified material selected from starch, cellulose and polymeric materials such as poly(vinyl alcohol) (PVA), poly (ethylene oxide) (PEO), and poly(acrylic acid).

The poly(acrylic acid) may be a partially neutralised, lightly cross-linked poly(acrylic acid).

The superabsorbent material may be in the form of fibres. Typically, the superabsorbent material is in the form of non-woven fibres. The length of the fibres can be up to about 100 mm, and is typically from about 20-75 mm, more typically from about 32 to 51 mm.

The superabsorbent material may comprise or consist of an air laid nonwoven fibre. By air laid nonwoven fibre, it is meant a continuous web formed by a mixture of short fibres and/or 100% pulped fibres.

The absorbent material may comprise a chemical pulp made from long fibre softwoods. Preferably, the absorbent material may be a fluff pulp. By the term fluff pulp, it is meant a chemical pulp made of cellulose fibres obtained from long softwoods.

In preferred embodiments, the absorbent materials may comprise a superabsorbent material and fluff pulp. Preferably, the absorbent material of the present invention comprises a poly(acrylic) acid and fluff pulp fibre blend.

The absorbent material may comprise, or consist of, a foam, such as a polymeric foam material, that is not a superabsorbent material. The polymeric foam may be a polyurethane foam. The polymeric foam may be open cell. The polymeric foam may be hydrophilic.

The absorbent material may comprise, or consist of, a gelling or semi-gelling material.

The term 'gelling material' is used herein to refer to a material in which substantially all of the components therein may gel upon contact with water or body fluid(s). For example, it may comprise a fibrous material wherein substantially all of the fibres are capable of gelling upon contact with water or body fluid(s).

The term 'semi-gelling' is used herein to refer to a material that comprises a mixture of components, some of which gel upon contact with water or body fluid(s) and some of which do not. For example, a semi-gelling absorbent material may comprise a combination of fibres, some of which gel upon contact with water or body fluid(s) and some of which do not.

The gelling or semi-gelling material may be in any available form, such as for example, fibres, granules, powder, flakes, sheet, foam, freeze dried foam, compressed foam, film, perforated film, beads, and combinations of two or more of the aforesaid.

The gelling or semi-gelling material may be selected from carboxymethylcellulose, alginate, chitosan salt or a chitosan salt derivative.

Typically, the gelling or semi gelling material is in the form of fibres. The fibres can be of any desired diameter or length and can be formed into a textile fabric or a pad for use. The fibres may be woven or non-woven. Preferably, the fibres are non-woven.

The absorbent members may be secured to the proximal surface of the backing layer. Preferably, the absorbent members are secured to the proximal surface of the backing layer using an adhesive.

The backing layer may have an adhesive on a proximal surface thereof. The adhesive may be located in the absorbent region of the proximal surface of the backing layer and/or the first border region.

The proximal surface of the backing layer may be fully or partially coated with an adhesive. The proximal surface of the backing layer may have a continuous or discontinuous coating of adhesive. The discontinuous coating of adhesive may comprise a pattern coated adhesive with an open area of from 5-75%.

Good results have been observed when the backing layer has a discontinuous coating of adhesive. The adhesive may be applied such that each absorbent member is adhered to the proximal surface of the backing layer and wherein the proximal surface of the backing layer is free from adhesive in the sections between adjacent absorbent members.

Beneficially, this increases breathability and enables increased transpiration of wound exudate through the backing layer. Moreover, it also ensures the absorbent region and the liquid-distribution region remain detached.

The adhesive may be any suitable physiologically acceptable adhesive known in the art. The adhesive may be any suitable skin-contact adhesive known in the art.

The adhesive may be a silicone adhesive, such as a polydimethylsiloxane adhesive. Alternatively, the adhesive can be an acrylic adhesive, a polyurethane adhesive, a hydrogel adhesive, or any combinations thereof.

The adhesive may be in the form of a powder, a liquid, a web or a net. The web may be an acrylic web.

The adhesive may comprise a meltable adhesive and/or a pressure sensitive adhesive, or the like. The meltable adhesive may be a heat-bonding adhesive or a heat-activated adhesive. The pressure sensitive adhesive may be acrylic based.

The adhesive may be a thermal adhesive. The adhesive may comprise any suitable thermal adhesive known in the art. For example, the thermal adhesive may be a thermoplastic adhesive, such as polycaprolactone.

The adhesive may be a powder. The powder may be scattered onto either or both surfaces to be attached and then passed through a heat tunnel to laminate the absorbent member and the backing layer.

In preferred embodiments, the adhesive is an acrylic adhesive. Preferably still, the adhesive is an acrylic adhesive that is pattern coated onto the proximal surface of the backing layer.

The liquid-distribution region may be present in the wound dressing to facilitate lateral and vertical wicking of the wound exudate from the locality of the wound contact layer to the absorbent region and the absorbent members therein.

The liquid-distribution region may be an integral part of the wound contact layer. Preferably, however, the liquid-distribution region is not an integral part of the wound contact layer, but is separate to it. In such embodiments, the liquid-distribution region may be attached to the distal surface of the wound contact layer. The liquid-distribution region may have a proximal surface facing toward the wound and a distal surface facing away from the wound. The proximal surface of the liquid-distribution region may be attached to the distal surface of the wound contact layer.

The distal surface of the liquid-distribution region may be located directly adjacent to the absorbent region.

The liquid-distribution region may be located centrally on the distal surface of the wound contact layer.

The distal surface of the wound contact layer may extend beyond the periphery of the liquid-distribution region in one or more directions. Typically, the distal surface of the wound contact layer extends beyond the periphery of the liquid-distribution region in all directions, such that the second border region surrounds the liquid-distribution region.

The liquid-distribution region is not limited to a particular shape. The liquid-distribution region may take a variety of shapes as desired or as appropriate. Typically, the liquid-distribution region has a generally rectangular shape.

The liquid-distribution region may comprise, or consist of, a liquid-distribution layer.

The liquid-distribution layer may be continuous or discontinuous.

Preferably, the liquid-distribution layer is continuous. In such an embodiment, the liquid-distribution layer may contain no fenestrations. Beneficially, a non-fenestrated liquid-distribution layer may prevent the passage of any gelling absorbent members through the liquid-distribution layer, where it may then pass through the wound contact layer and into the wound.

Alternatively, the liquid-distribution layer may be discontinuous. In such an embodiment, the liquid-distribution layer may contain one or more fenestrations. The fenestrations may comprise slits, openings or perforations. The fenestrations may penetrate through the entire thickness of the liquid-distribution layer. Alternatively, the fenestrations may penetrate partially through the thickness of the liquid-distribution layer. Preferably, the fenestrations extend through the entire thickness of the liquid-distribution layer.

The fenestrations may be arranged in one or more directions in the liquid-distribution layer. The fenestrations may be arranged in a linear repeating pattern. Alternatively, the fenestrations may be arranged in a random configuration.

The fenestrations facilitate the flow of wound exudate through the dressing and improve the conformability of the dressing.

The liquid-distribution region is not limited to a particular shape. The liquid-distribution region may take a variety of shapes as desired or as appropriate. Typically, the liquid-distribution layer has a generally rectangular shape.

The liquid-distribution region may have a higher lateral wicking rate than the wound contact layer. The liquid-distribution region may have a higher vertical wicking rate than the wound contact layer.

The liquid-distribution region may have a higher lateral wicking rate than the absorbent members. The liquid-distribution region may have a higher vertical wicking rate than the absorbent members.

The term lateral wicking rate refers to the rate at which liquid, such as wound exudate, is dispersed in the X-Y plane of the layer. By the X-Y plane it is meant a direction parallel to the wound site, and is generally defined by the length and width of the layer. Typically, the lateral wicking rate of the liquid-distribution region is measured by determining the time taken for a liquid to wick to the edge of the material. The liquid-distribution region may have a low surface energy. The liquid-distribution region may have a high capillary action.

The term vertical wicking rate refers to the rate at which liquid, such as wound exudate, is dispersed in the Z-X and/or Z-Y planes of the layer. By the Z-X and/or Z-Y planes it is meant a direction perpendicular to the wound site, and is generally defined by the depth of the layer. Typically, the vertical wicking rate of the liquid-distribution region is measured by determining the time taken for the liquid to wick from a proximal surface of the liquid-distribution region to a distal surface of the liquid-distribution region.

A higher lateral and/or vertical wicking rate in the liquid-distribution region enables wound exudate to be rapidly dispersed in that region. This has the beneficial effect of maximising the contact of wound exudate with the plurality of absorbent members, thereby increasing the uptake of wound exudate from the wound.

The liquid-distribution region may be hydrophilic. The liquid-distribution region may comprise, or consist of, a hydrophilic material.

The term 'hydrophilic material' is used herein to refer to a material which has a substantially high affinity for water. Preferably, the hydrophilic material is substantially permeable to fluids, such as liquids and gases.

The liquid-distribution region may be in the form of a foam or a non-woven fabric.

The liquid-distribution region may comprise a biologically acceptable polymer material. Suitable biologically acceptable polymer materials may be selected from the group consisting of polyurethane, polyvinyl chloride, polystyrene, polyimide, silicone, cotton, polyester, polypropylene, chitosan, alginate, cellulose, oxidised regenerated cellulose, collagen, carboxymethyl cellulose, carboxyethyl cellulose, hydroxyethyl cellulose, hydroxypropyl cellulose, hydroxypropylmethyl cellulose, cellulose ethyl sulphonate, and combinations of any two or more thereof.

The liquid-distribution region may comprise, or consist of, a polyurethane foam. Alternatively, the liquid-distribution region may comprise, or consist of, a carboxymethyl cellulose non-woven fabric. Alternatives to carboxymethyl cellulose may be selected from the group consisting of carboxyethyl cellulose, hydroxyethyl cellulose, hydroxypropyl cellulose, hydroxypropylmethyl cellulose, cellulose ethyl sulphonate.

Good results have been observed with a liquid-distribution region of polyurethane foam. The polyurethane foam may be open-celled so as to allow for the passage of wound exudate through the foam and into the adjacent absorbent members. Closed celled foams are not preferred for the liquid-distribution region as they do not readily allow the passage of exudate through the foam.

The liquid-distribution region may have a thickness of from 0.5-3 mm. Good results have been observed when the liquid-distribution region has a thickness great enough to rapidly wick exudate, yet thin enough to not substantially increase the overall profile of the dressing. It has been observed that a wound dressing comprising a low overall profile is more conformable and has a reduced risk of being caught on a patient's clothing and/or bedding.

The liquid-distribution region may be secured to a distal surface of the wound contact layer. Preferably, the liquid-distribution region is secured to the distal surface of the wound contact layer using an adhesive.

The adhesive may be applied to either or both of the surfaces that will be contacted with each other.

The adhesive may be applied across substantially all of either or both surfaces or, alternatively, across a portion or portions thereof.

The wound contact layer may have an adhesive on a distal surface thereof. The adhesive may be located in the liquid-distribution region of the distal surface of the wound contact layer and/or the second border region.

The distal surface of the wound contact layer may be fully or partially coated with an adhesive. The distal surface of the wound contact layer may have a continuous or discontinuous coating of adhesive.

The adhesive may be any suitable physiologically acceptable adhesive known in the art. The adhesive may be any suitable skin-contact adhesive known in the art.

Preferably, the adhesive is a silicone adhesive, such as a polydimethylsiloxane adhesive. Alternatively, the adhesive can be an acrylic adhesive, a polyurethane adhesive, a hydrogel adhesive, or any combinations thereof.

The adhesive may be in the form of a powder, a liquid, a web or a net. The web may be an acrylic web.

The adhesive may comprise a meltable adhesive and/or a pressure sensitive adhesive, or the like. The meltable adhesive may be a heat-bonding adhesive. The pressure sensitive adhesive may be acrylic based.

The adhesive may be a thermal adhesive. The adhesive may comprise any suitable thermal adhesive known in the art. For example, the thermal adhesive may be a thermoplastic adhesive, such as polycaprolactone.

The adhesive may be a powder. The powder may be scattered onto either or both surfaces to be attached and then passed through a heat tunnel to laminate the liquid-distribution layer and the wound contact layer.

The wound contact layer is intended in use to come into direct contact with the wound.

The wound contact layer may be a liquid-distribution layer. This is applicable in embodiments that do not comprise a liquid-distribution region. Where the wound contact layer is a liquid-distribution layer, it may comprise, or consist of, any of materials referred to herein in relation to the liquid-distribution region.

The wound contact layer may have a laminate structure. The laminate structure may comprise two or more layers. The laminate structure may comprise two, three, four, five, six, seven, eight, nine, ten or more layers.

Preferably, the wound contact layer comprises a trilaminate structure. Such embodiments may refer to the wound contact layer as a wound contact trilaminate. The trilaminate structure may have a central carrier layer, a proximal layer and a distal layer. The proximal layer may comprise an adhesive for contacting and securing the wound contact layer to the wound and/or the skin surrounding the wound. The distal layer may comprise an adhesive for securing the wound contact layer to the liquid-distribution region, the first border region and/or a perimeter of the absorbent region, as desired or as appropriate.

The wound contact layer may comprise one or more perforations to facilitate the passage of wound exudate to the liquid-distribution region. The wound contact layer may comprise a plurality of perforations.

The perforations may be arranged in one or more directions on the wound contact layer. The perforations may be arranged in a linear repeating pattern. Alternatively, the perforations may be arranged in a random configuration.

The perforations may extend fully through the wound contact layer. Alternatively, the perforations extend partially through the wound contact layer.

The perforations may be substantially circular. The perforations may have a diameter of from 0.5-10 mm.

The perforations in the wound contact layer increases the rate of uptake of wound exudate from the wound contact layer, thereby improving the effectiveness of the wound dressing. The perforations in the wound contact layer also reduce the adhesion of the wound contact layer to the wound and/or the skin surrounding the wound. Advantageously, this reduces damage to the wound area upon removal of the dressing.

The distal layer of the wound contact trilaminate preferably comprises an adhesive. The adhesive is preferably an acrylic adhesive. The adhesive is also preferably a pressure sensitive adhesive. However, the adhesive may comprise any of the adhesives referred to herein and be applied by any of the methods referred to herein.

The distal layer of adhesive may be coated onto the distal surface of the carrier layer with a coat weight of from 5 to 50 gsm.

The proximal layer of the wound contact trilaminate preferably comprises a biocompatible pressure sensitive adhesive. The adhesive may be any suitable skin-contact adhesive known in the art. The adhesive may comprise a silicone adhesive or polyurethane adhesive. Typically, the adhesive is a silicone adhesive, such as polydimethylsiloxane. Alternatively, the adhesive can be an acrylic adhesive, a polyurethane adhesive, a hydrogel adhesive such as for example an atraumatic hydrogel adhesive, or any combinations thereof. The adhesive is intended to create a tight seal between the wound dressing and the patient's skin surrounding the wound.

The proximal layer of adhesive may be coated onto the proximal surface of the carrier layer with a coat weight of from 30 to 300 gsm.

The carrier layer of the wound contact trilaminate may comprise, or consist of, a polyurethane film. Alternatively, the carrier layer of the wound contact trilaminate may comprise, or consist of, a polyethylene film. Preferably, the carrier layer comprises a low density polyethylene.

The wound contact layer is not limited to a particular size or shape unless specifically defined herein. The wound contact layer may take a variety of sizes or shapes as desired or as appropriate. Typically, the wound contact layer has a generally rectangular shape. Preferably, the wound contact layer has a generally square shape.

The backing layer may serve as a barrier and may be operable to prevent microorganisms, such as bacteria, from entering the wound dressing from an external source, such as clothing, etc. Further, the backing layer is also operable to retain wound exudate within the wound dressing and prevent it leaching out of the wound dressing.

The backing layer may be gas-permeable. The backing layer may be substantially impermeable to microorganisms, such as bacteria. The backing layer may be substantially impermeable to liquids.

The permeability of the backing layer to gases, such as air and moisture vapour, permits the transmission of moisture vapour through its structure. This facilitates the transpiration of wound exudate from the dressing into the external environment. Beneficially, this increases the breathability of the dressing and prevents the saturation of the dressing with exudate, which leads to a reduced number of dressing changes.

The backing layer may have a moisture vapour transmission rate in the range of 50 g/100 $cm^2$/24 hours to 200 g/100 $cm^2$/24 hours. Good results are observed when the backing layer has a moisture vapour transmission rate in the range of 80 g/100 $cm^2$/24 hours to 160 g/100 $cm^2$/24 hours. In a preferred embodiment, the backing layer has a moisture vapour transmission rate of 100 g/100 $cm^2$/24 hours to 120 g/100 $cm^2$/24 hours.

The backing layer may comprise a material that is gas-permeable and liquid-impermeable. The backing layer may also comprise a material that is microorganism-impermeable.

The backing layer may comprise, or consist of, any biologically acceptable polymer material that is liquid- and/or microorganism-impermeable but gas-permeable. Suitable biologically acceptable polymer materials for the backing layer may be selected from the group consisting of polyurethane and polyethylene.

The backing layer may be in the form of a film, a foam, or a combination thereof. Preferably, the backing layer is in the form of a film.

Preferably, the backing layer comprises, or consists of, a polyurethane film.

The polyurethane film typically has a weight of 5-40 gsm. The backing layer may have a thickness of from 5-50 microns, preferably 10-30 microns.

The backing layer may have a surface area greater than that of the absorbent region.

The backing layer is not limited to a particular size or shape unless specifically defined herein. The backing layer may take a variety of sizes or shapes as desired or as appropriate. Typically, the backing layer has a generally rectangular shape. Preferably, the backing layer has a generally square shape.

The backing layer may be attached to the wound contact layer in the respective first and second border regions such that the absorbent region is adjacent to the liquid-distribution region.

Typically, the first border region surrounds the absorbent region and the second border region surrounds the liquid-distribution region. The backing layer may be attached to the wound contact layer in all or part of the border regions.

Preferably, the backing layer and the wound contact layer are attached to each other by adhesion in the border regions, so as to encapsulate the absorbent region and the liquid-distribution region. The absorbent region and the liquid-distribution region are adjacent to, but detached from, each other.

The backing layer may be attached to the wound contact layer using an adhesive. The adhesive may be coated to the first border region and/or the second border region.

The adhesive coating in the first and/or second border regions may be continuous or discontinuous.

The adhesive is preferably an acrylic based pressure sensitive adhesive but may comprise any of the adhesives referred to herein and be applied by any of the methods referred to herein.

The wound dressing may further comprise a removable protecting layer. The removable protecting layer may be a peelable protecting layer. The removable protecting layer may cover the proximal surface of the wound contact layer. The protecting layer facilitates storage of the wound dressing without detriment to the skin-contact adhesive on the proximal surface of the wound contact layer or forming the proximal layer of the wound contact laminate. The protecting layer is intended for removal prior to application of the dressing to a wound.

The removable protecting layer may comprise one, two, or more parts that are separately removable via one, two, or more tabs.

The wound dressing may further comprise one or more additional components as desired or appropriate. Any one or more of the wound contact layer, the absorbent region, the liquid-distribution region and/or the backing layer may further comprise the one or more additional components. Such additional components may include, but are not limited to, pharmaceutical agents; wetting agents such as surfactants; growth factors; cytokines; agents which absorb agents which delay healing such as MMP's (matrix metalloproteinases) and elastase; and/or another wound dressing component, such as calcium, vitamin K, fibrinogen, thrombin, factor VII, factor VIII, clays such as kaolin, oxidised regenerated cellulose, gelatin, or collagen, etc.

According to a further aspect of the present invention, there is provided a method of manufacturing a wound dressing comprising the steps of:
  providing a backing layer having a proximal surface facing toward the wound and a distal surface facing away from the wound,
  locating an absorbent region on the proximal surface of the backing layer, such that the proximal surface of the backing layer extends beyond the perimeter of the absorbent region to define a first border region, the absorbent region comprising a plurality of discrete absorbent members;
  providing a wound contact layer having a proximal surface facing toward the wound and a distal surface facing away from the wound,
  optionally locating a liquid-distribution region on the distal surface of the wound contact layer;

attaching the first border region of the backing layer to the wound contact layer or the liquid-distribution layer such that the absorbent region and the wound contact layer or liquid-distribution region are adjacent to each other, and wherein the absorbent region and the wound contact layer or the liquid-distribution region are detached in the area inside the perimeter of the absorbent region.

According to a further aspect of the present invention, there is provided a method of manufacturing a wound dressing comprising the steps of:
  providing a backing layer having a proximal surface facing toward the wound and a distal surface facing away from the wound,
  locating an absorbent region on the proximal surface of the backing layer, such that the proximal surface of the backing layer extends beyond the perimeter of the absorbent region to define a first border region, the absorbent region comprising a plurality of discrete absorbent members;
  providing a wound contact layer having a proximal surface facing toward the wound and a distal surface facing away from the wound;
  locating a liquid-distribution region on the distal surface of the wound contact layer, such that the distal surface of the wound contact layer extends beyond a perimeter of the liquid-distribution region to define a second border region;
  attaching the backing layer and the wound contact layer in at least a portion of the respective first and second border regions such that the absorbent region and the liquid-distribution region are adjacent to each other, and wherein the absorbent region and the liquid-distribution region are detached in the area inside the perimeter of the absorbent region.

The method may comprise coating the proximal surface of the backing layer with an adhesive for adhering the absorbent region and/or the absorbent members to the backing layer.

The method may comprise coating the distal surface of the wound contact layer with an adhesive for adhering the liquid-distribution region to the wound contact layer. Alternatively, the wound contact layer may comprise a laminate structure as described hereinbefore, wherein a distal layer thereof comprises or consists of an adhesive.

The method may comprise coating the first and/or second border regions with an adhesive.

According to a further aspect of the present invention, there is provided a method of absorbing fluid discharged from a physiological target site of a human or animal body, or of stemming a flow of a fluid discharged from a physiological target site of a human or animal body, comprising applying to the physiological target site a wound dressing as defined herein.

According to a further aspect of the present invention, there is provided a use of a wound dressing as defined herein, in absorbing fluid discharged from a physiological target, or in stemming a flow of a fluid discharged from a physiological target site.

According to a further aspect of the present invention, there is provided a wound dressing as defined herein, for use in absorbing fluid discharged from a physiological target, or for use in stemming a flow of a fluid discharged from a physiological target site.

The further aspects of the present invention may incorporate any of the features of the other aspects of the invention described herein as desired or as appropriate.

DETAILED DESCRIPTION OF THE INVENTION

In order that the invention may be more clearly understood, one or more embodiments thereof will now be described, by way of example only, with reference to the accompanying drawings, of which:

FIG. 1: shows a cross-section view of a first embodiment of a wound dressing.

Figure 2:
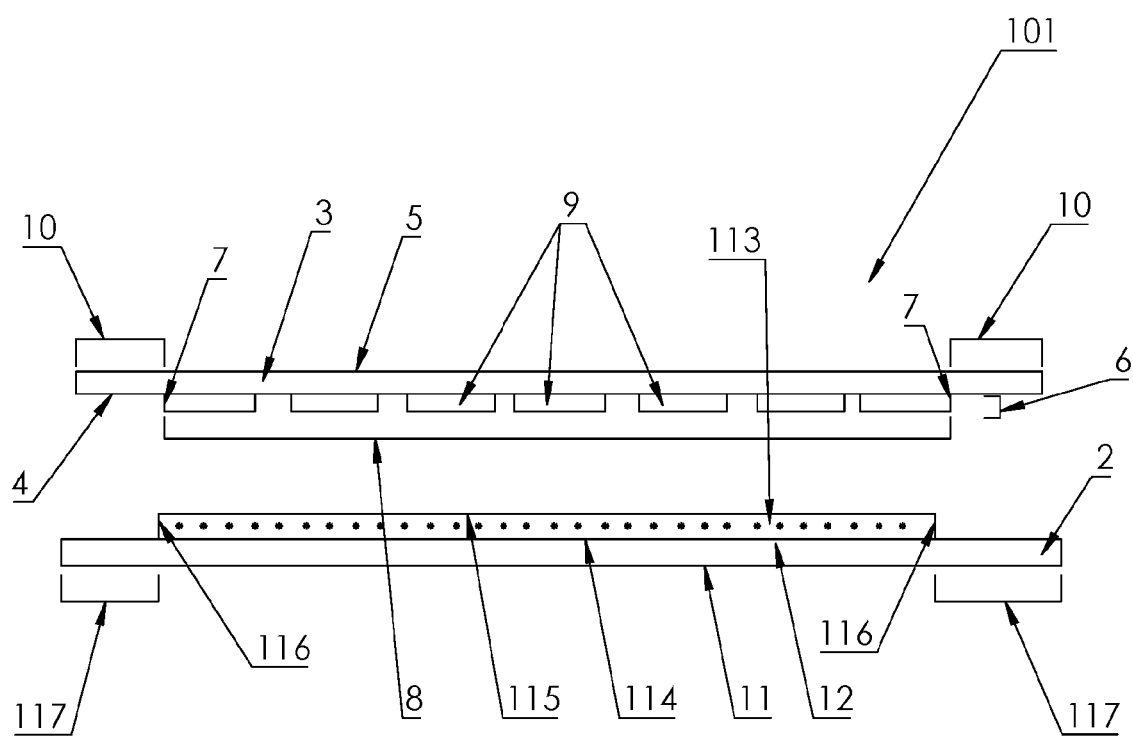

FIG. 2: shows a cross-section view of a second embodiment of a wound dressing comprising a liquid-distribution region.

Figure 3:
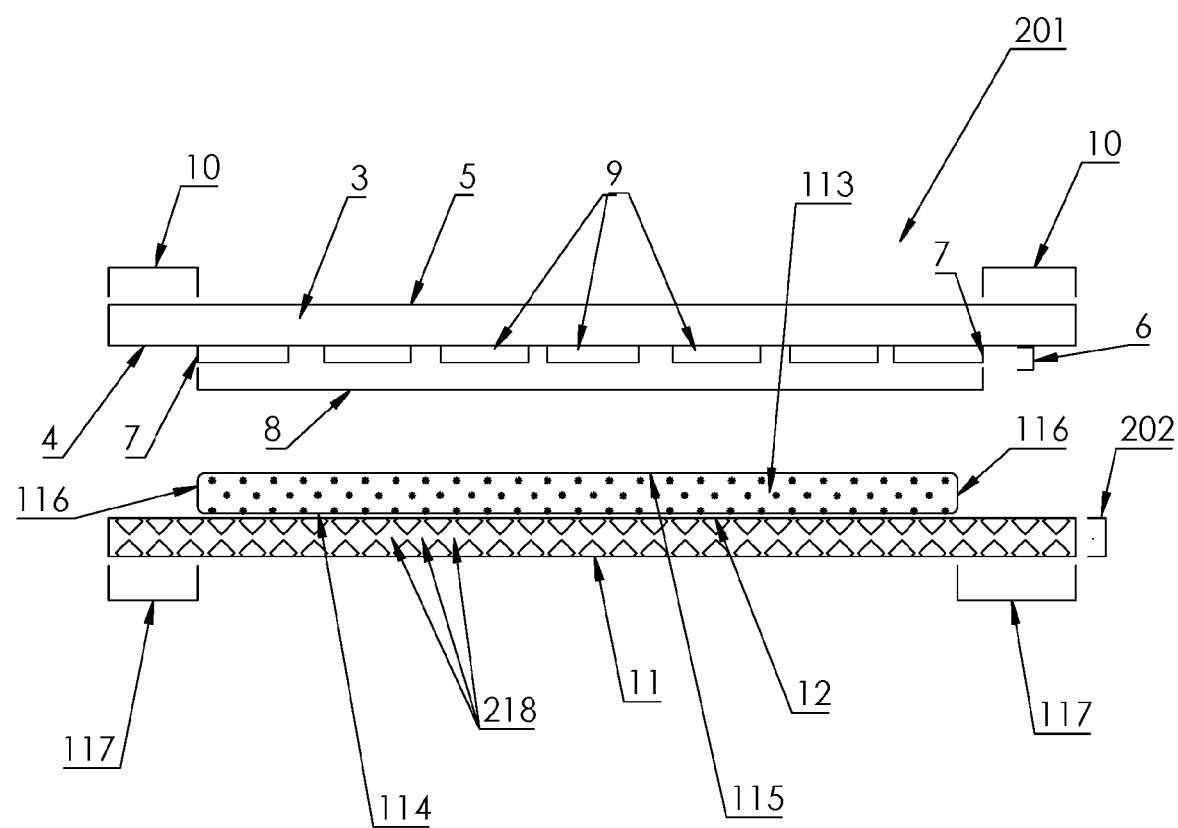

FIG. 3: shows a cross-section view of a third embodiment of a wound dressing comprising a perforated wound contact layer.

Figure 4:
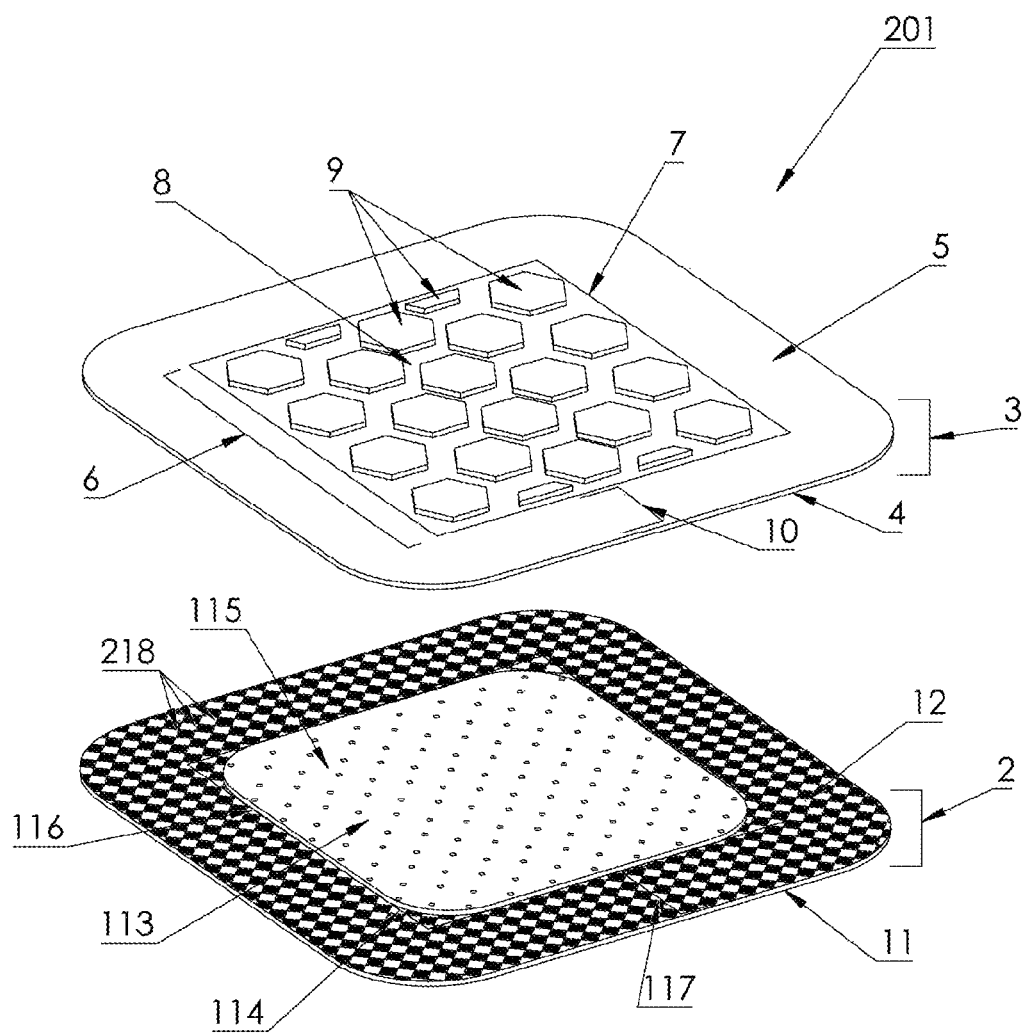

FIG. 4: shows an exploded view of the wound dressing depicted in FIG. 3.

Figure 5:
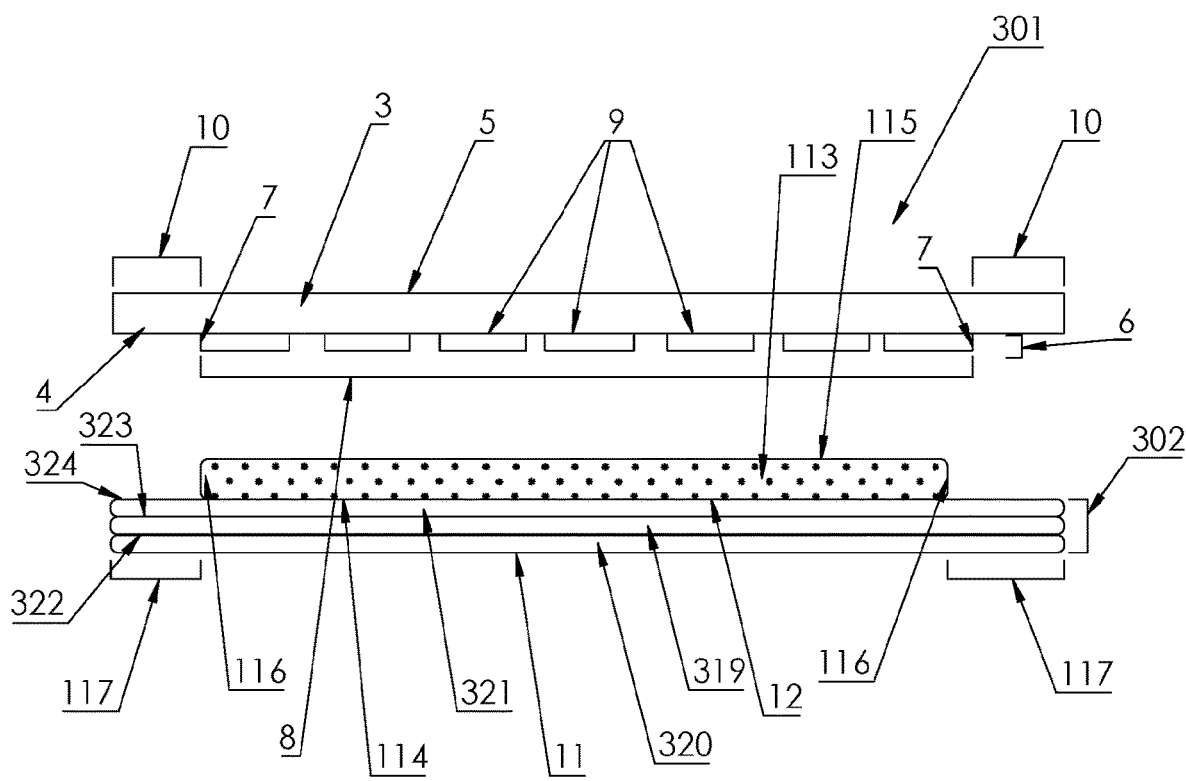

FIG. 5: shows a cross-section view of a fourth embodiment of a wound dressing comprising a trilaminate wound contact layer.

Figure 6:
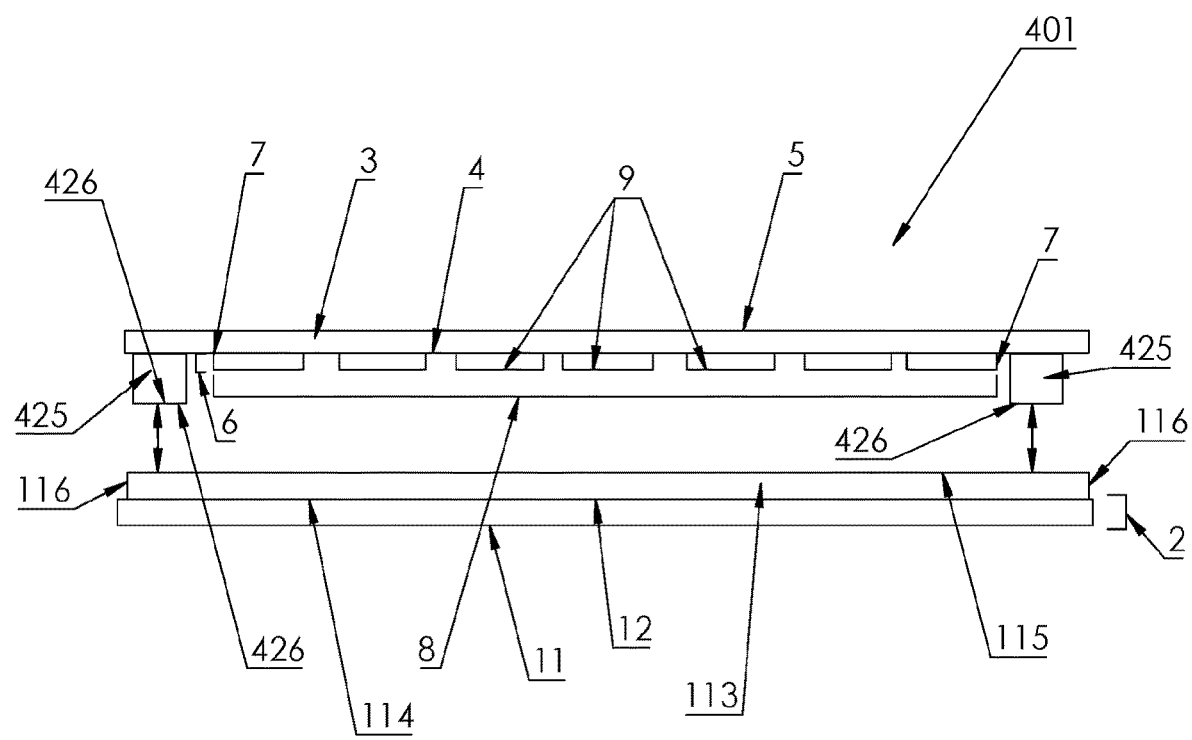
Figure 7:
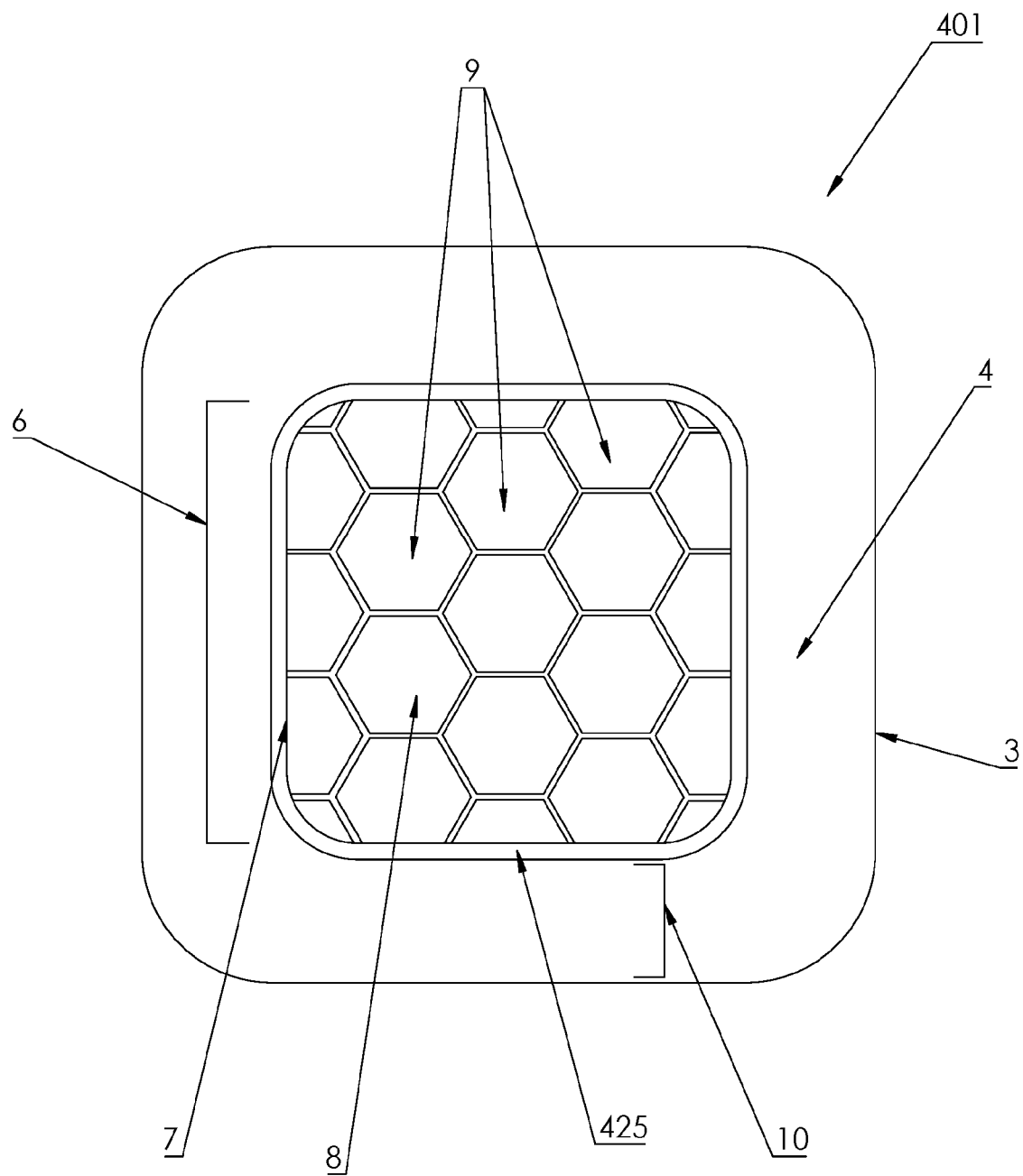

FIG. 6: shows a cross-section view of a fifth embodiment of a wound dressing FIG. 7: shows an underside view of a backing layer and absorbent region.

Figure 8:
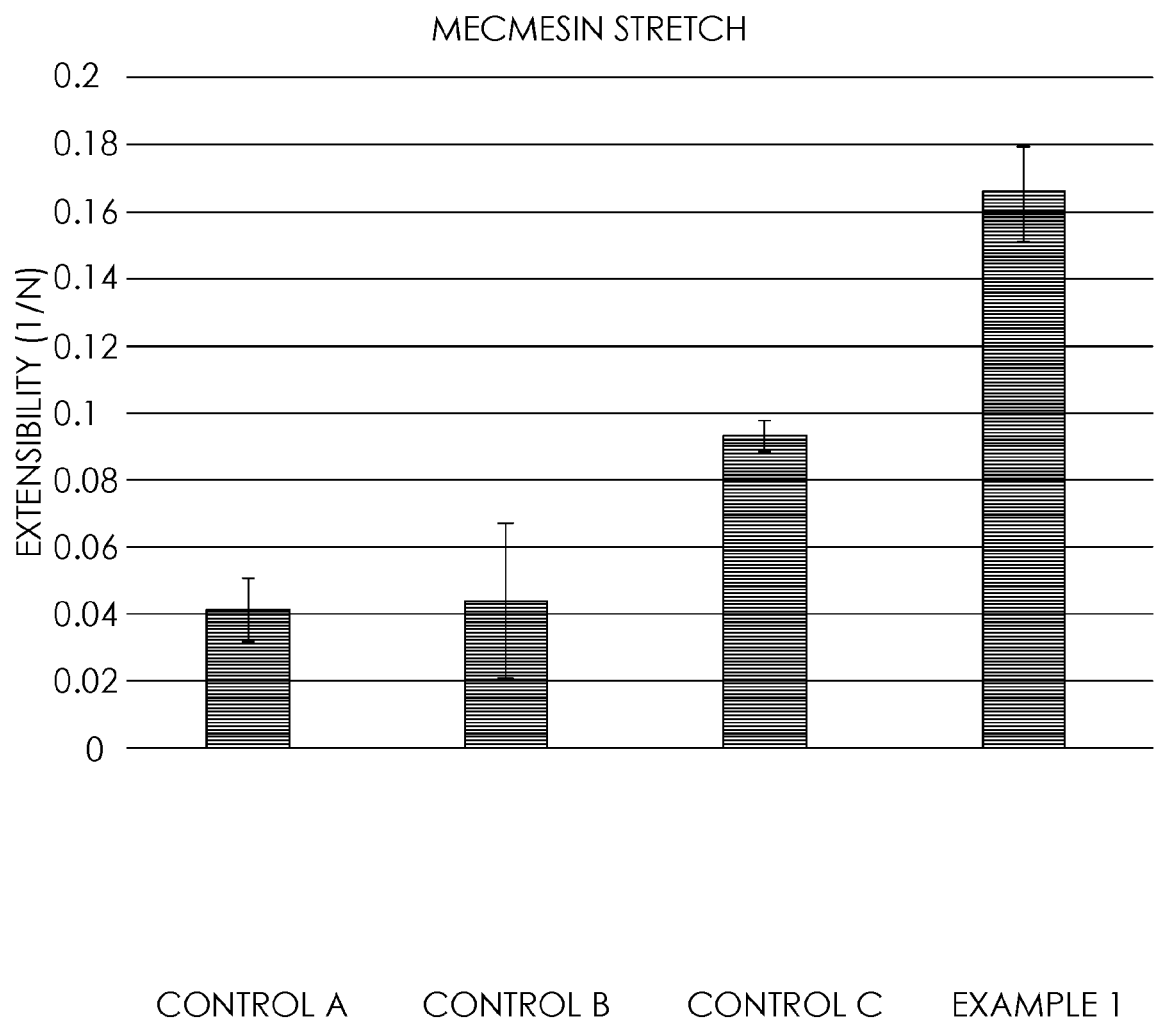

FIG. 8: graphically shows the extensibility of a wound dressing according to the present invention.

Referring to FIG. 1, there is shown a wound dressing 1 comprising a wound contact layer 2 and a backing layer 3.

The backing layer 3 has a proximal surface 4 that faces towards the wound to which the wound dressing 1 is to be applied. The backing layer 3 also has a distal surface 5 that faces away from the wound to which the dressing 1 is to be applied.

The backing layer 3 in this embodiment is formed of a polyurethane film. The polyurethane film has a weight of 5-40 gsm. The backing layer 3 permits transpiration of exudate from the dressing into the external environment.

The backing layer 3 has an absorbent region 6 located on its proximal surface 4. The absorbent region 6 has a perimeter 7, defining an area 8 inside the perimeter 7.

The absorbent region 6 comprises a plurality of absorbent islands 9. In this embodiment, the absorbent islands 9 comprise an air-laid fabric of a poly(acrylic) acid based superabsorbent and fluff pulp blend. The absorbent islands 9 are attached to the proximal surface 4 of the backing layer 3 using an adhesive (not shown) applied to the proximal surface 4 of the backing layer 3. The adhesive coating on the proximal surface 4 of the backing layer 3 is discontinuous, such that it is substantially only applied in the locations of the absorbent islands 9.

The absorbent islands 9 are evenly spaced apart in the absorbent region 6. In use, when wound exudate passes through the wound contact layer 2 it will be absorbed by the absorbent islands 9.

The backing layer 3 extends beyond the perimeter 7 of the absorbent region 6 to define a first border region 10. The first border region 10 extends around the absorbent region 6, in an area outside the perimeter of the absorbent region 6, such that the absorbent region 6 is located centrally on the proximal surface 4 of the backing layer 3. An adhesive (not shown) is applied to the proximal surface 4 of the backing layer 3 in the first border region 10.

The wound contact layer 2 has a proximal surface 11 that faces towards the wound to which the wound dressing 1 is to be applied. The wound contact layer 2 also has a distal surface 12 that faces away from the wound to which the dressing 1 is to be applied. The wound contact layer 2 in this embodiment is formed of a polyurethane film.

The backing layer 3 is positioned over the wound contact layer 2, such that the absorbent region 6 is located directly adjacent to the distal surface 12 of the wound contact layer 2. The backing layer 3 is attached to the wound contact layer 2 by adhering the first border region 10 to the distal surface 12. With the first border region 10 adhered to the distal surface 12, the absorbent region 6 and the wound contact layer 2 are detached in the area 8 inside the perimeter 7 of the absorbent region 6. Adhering the backing layer 3 to the wound contact layer 2 creates a seal around the absorbent region 6, which reduces the risk of liquid, such as wound exudate, leaking from the absorbent region 6 to an area outside the perimeter 7 and, potentially, an area outside the wound dressing 1.

Referring to FIG. 2, there is shown a wound dressing 101. The wound dressing 101 further comprises a liquid-distribution region 113.

The liquid-distribution region 113 is in the form of a layer, having a proximal surface 114 and a distal surface 115.

In this embodiment, the liquid distribution layer 113 is formed of a polyurethane foam. The liquid-distribution layer 113 has a high lateral and vertical wicking rate to increase the absorption of exudate from the wound site and to transmit wound exudate to the absorbent region 6. In this embodiment, the liquid-distribution layer 113 has a thickness of 1.5 mm.

The proximal surface 114 of the liquid-distribution layer 113 is located on the distal surface 12 of the wound contact layer 2. The liquid-distribution layer 113 is attached to the distal surface 12 of the wound contact layer 2 using an adhesive (not shown). The adhesive is coated onto the distal surface 2 of the wound contact layer 2 and/or the proximal surface 114 of the liquid-distribution layer 113.

The wound contact layer 2 extends beyond a perimeter 116 of the liquid-distribution region 113 to define a second border region 117. The second border region 117 extends around the liquid-distribution region 113, in an area outside the perimeter 116 of the liquid-distribution region 113, such that the liquid-distribution region 113 is located centrally on the distal surface 12 of the wound contact layer 2. An adhesive (not shown) is applied to the distal surface 12 of the wound contact layer 2 in the second border region 117.

The backing layer 3 is positioned over the wound contact layer 2 and the liquid-distribution layer 113, such that the absorbent region 6 is located directly adjacent to the distal surface 115 of the liquid-distribution layer 113.

The backing layer 3 is attached to the wound contact layer 2 by adhering the first border region 10 to the second border region 117, encapsulating the absorbent region 6 and the liquid-distribution region 113. Adhering the backing layer 3 to the wound contact layer 2 creates a seal around the absorbent region 6, which reduces the risk of liquid, such as wound exudate, leaking from the absorbent region 6 to an area outside the perimeter 7 and, potentially, an area outside the wound dressing 101.

With the first border region 10 adhered to the second border region 117, the absorbent region 6 and the liquid-distribution region 113 are detached in the area 8 inside the perimeter 7 of the absorbent region 6.

In use, when the proximal surface 11 of the wound contact layer 2 is placed on a wound, wound exudate will pass through the wound contact layer 2, be distributed throughout the liquid-distribution layer 113 and then absorbed by the absorbent islands 9.

Referring to FIGS. 3 and 4, there is shown a wound dressing 201. The wound dressing 201 corresponds to the wound dressing 101, but the wound contact layer 202 has a plurality of perforations 218. The perforations 218 aid in the uptake of fluid from the wound site and reduce the adhesion of the wound contact layer 202 to the wound and/or the skin surrounding the wound, thereby aiding in the removal of the dressing from the wound site.

Furthermore, as best shown in FIG. 4, the absorbent islands 9 have a hexagonal cross-section and are arranged in a honeycomb pattern on the proximal surface 4 of the backing layer 3 in the absorbent region 6.

Referring to FIG. 5, there is shown a wound dressing 301. The wound dressing 301 corresponds to the wound dressing 101, but the wound contact layer 302 has a trilaminate structure.

The trilaminate wound contact layer 302 comprises a carrier layer 319, a proximal layer 320, and a distal layer 321. The proximal layer 320 is located on a proximal surface 322 of the carrier layer 319. The distal layer 321 is located on a distal surface 323 of the carrier layer 319.

In this embodiment, the carrier layer 319 comprises a polyurethane film, the proximal layer 320 comprises an atraumatic polydimethylsiloxane adhesive and the distal layer 321 comprises an acrylic adhesive.

The distal layer 321 facilitates the adherence of a proximal surface 114 of the liquid-distribution region 113 to the distal surface and also the adherence of the wound contact layer 2 to the backing layer 3 in the border regions 10, 117.

The trilaminate 302 may contain perforations (not shown), as described in relation to the embodiment of FIG. 3. In such embodiments, the perforations may extend fully through the carrier layer 319, the proximal layer 320 and the distal layer 321.

The trilaminate wound contact layer 302 extends beyond a perimeter 116 of the liquid-distribution region 113 to define a second border region 117. The second border region 117 extends around the liquid-distribution region 113, in an area outside the perimeter 116 of the liquid-distribution region 113, such that the liquid-distribution region 113 is located centrally on the distal layer 321. An adhesive (not shown) is applied to the distal surface 324 of the distal layer 321 in the second border region 117.

As described in relation to the embodiment of FIG. 2, the backing layer 3 is positioned over the wound contact layer 302 and the liquid-distribution layer 113, such that the absorbent region 6 is located directly adjacent to the distal surface 115 of the liquid-distribution layer 113.

The backing layer 3 is attached to the wound contact layer 302 by adhering the first border region 10 to the second border region 117, encapsulating the absorbent region 6 and the liquid-distribution region 113.

With the first border region 10 adhered to the second border region 117, the absorbent region 6 and the liquid-distribution region 113 are detached in the area 8 inside the perimeter 7 of the absorbent region 6.

Referring to FIGS. 6 and 7, there is shown a wound dressing 401.

The wound dressing 401 comprises a frame 425 surrounding the perimeter 7 of the absorbent region 6. The absorbent region 6 is enclosed within the frame 425. The frame 425 is attached to the proximal surface 4 of the backing layer 3.

The frame 425 has a proximal surface 426. The frame 425 is attached to a distal surface 115 of the liquid-distribution region 113.

The backing layer 3 is positioned over wound contact layer 2 and liquid-distribution region 113, such that the absorbent region 6 is located directly adjacent to the distal surface 115 of the liquid-distribution region 113. The frame 425 is attached to the liquid-distribution region 115 by adhering the proximal surface 426 to the distal surface 115. With the frame 425 adhered to the distal surface 115, the absorbent region 6 and the liquid-distribution region 115 are detached in the area 8 inside the perimeter 7 of the absorbent region 6.

In this embodiment shown in FIG. 6, the area of the distal surface 115 of the liquid-distribution region 113 extends beyond the perimeter 7 of the absorbent region 6 and its surrounding frame 425. Of course, in alternative embodiments the area of the distal surface 115 of the liquid-distribution region 113 may not extend beyond the perimeter 7 of the absorbent region 6. In such embodiments, the frame 425 will be adhered directly to the distal surface 12 of the wound contact layer 2.

In use, the frame serves to reduce the risk of liquid, such as wound exudate, leaking from the absorbent region 6 to an area outside the perimeter 7 of the absorbent region 6 and, potentially, an area outside the wound dressing 401.

In use, when a human or animal suffers a penetrating wound, the wound dressing 1, 101, 201, 301, 401 is applied to the wound, with the proximal surface 11 of the wound contact layer 2, 202, 302 being placed in direct contact with the wound. Having the absorbent region 6 and the wound contact layer 2, 202, 302 and/or the liquid-distribution region 113 detached in the area 8, in combination with the absorbent region 6 comprising a plurality of discrete absorbent islands 9, enables the wound dressing 1, 201, 301, 401 to stretch and readily conform to the contours of the anatomical area to which the wound dressing 1 is being applied. Once in place, the wound dressing 1 is able to stretch with the patient's bodily movements as necessary.

Example

In order to evaluate the extensibility of a wound dressing according to the present invention, the following wound dressing construction was tested according to the test method set out below.

The assembled wound dressing (Example 1) comprised:
i. a polyurethane film backing layer 3 with a discontinuous coating of acrylic adhesive on a proximal surface thereof;
ii. a perforated wound contact layer 302 having a trilaminate construction comprising a carrier layer 319 of polyurethane film, a proximal layer 320 of atraumatic polydimethylsiloxane adhesive and a distal layer 321 of acrylic adhesive;
iii. an absorbent region 6 consisting of a plurality of absorbent islands 9 secured to the discontinuous coating of acrylic adhesive on the proximal surface of the backing layer;
iv. a liquid-distribution layer 113 comprising a polyurethane foam attached to the distal surface of the wound contact layer 2; and
v. the absorbent region 6 and the liquid distribution region 115 are adjacent to each other but not attached.

A comparison wound dressing, Control A, was constructed with the same construction as Example 1 above, although the absorbent region comprised a single continuous absorbent region, and the absorbent region and the liquid distribution region were adjacent to each other and attached.

A comparison wound dressing, Control B, was constructed with the same construction as Control A, although the absorbent region and the liquid distribution region were adjacent but not attached.

A comparison wound dressing, Control C, was constructed with the same construction as Control A above, although the absorbent region comprised a plurality of absorbent islands.

The below test method determines the extensibility and conformability of the dressing.

Test Method:
(a) clamp the wound dressing into the jaws of a tensile strength testing machine (Mecmesin® MultiTest-i) by the edges of the wound dressing;
(b) extend the dressing by 5% using an extension rate of 300 mm/min;
(c) record the load applied to the wound dressing at this extension.

The above test method was repeated six times for each sample and the results are shown in Table 1 below.

TABLE 1

| Sample | Test | Extensibility (1/N) |
|---|---|---|
| Control A | 1 | 0.048 |
| | 2 | 0.027 |
| | 3 | 0.051 |
| | 4 | 0.052 |
| | 5 | 0.043 |
| | 6 | 0.045 |
| | Mean | 0.044 |
| | Standard Deviation | 0.009 |
| Control B | 1 | 0.039 |
| | 2 | 0.037 |
| | 3 | 0.035 |
| | 4 | 0.034 |
| | 5 | 0.033 |
| | 6 | 0.091 |
| | Mean | 0.045 |
| | Standard Deviation | 0.023 |
| Control C | 1 | 0.090 |
| | 2 | 0.091 |
| | 3 | 0.103 |
| | 4 | 0.092 |
| | 5 | 0.096 |
| | 6 | 0.093 |
| | Mean | 0.094 |
| | Standard Deviation | 0.005 |
| Example 1 | 1 | 0.175 |
| | 2 | 0.169 |
| | 3 | 0.172 |
| | 4 | 0.174 |
| | 5 | 0.170 |
| | 6 | 0.139 |
| | Mean | 0.166 |
| | Standard Deviation | 0.014 |

The extensibility of the wound dressing construction according to the present invention (Example 1) in comparison with Control wound dressings A, B and C is shown graphically in FIG. 8.

Example 1 showed an average increase in extensibility of 277% over Controls A, B and C. Moreover, the test results demonstrate that the combination of a detached absorbent region and liquid-distribution region and an absorbent region comprising a plurality of absorbent islands has a synergistic effect on the extensibility of the dressing. As shown in FIG. 8, these features, when added independently, only account for a 2% (Control B) and 114% (Control C) increase in extensibility respectively.

The embodiments are described above by way of example only. Many variations are possible without departing from the scope of protection afforded by the appended claims.

The invention claimed is:

1. A wound dressing for application to a wound, comprising:
   a wound contact layer having a proximal surface facing toward the wound and a distal surface facing away from the wound, and
   a backing layer having a proximal surface facing toward the wound and a distal surface facing away from the wound,
   the backing layer having an absorbent region located on a proximal surface thereof, the absorbent region comprising a plurality of discrete absorbent members,
   wherein the backing layer is configured to be positioned over the wound contact layer, such that the absorbent region is located adjacent to the distal surface of the wound contact layer, wherein the proximal surface of the backing layer extends beyond the perimeter of the absorbent region to define a first border region, wherein the backing layer is attached to the wound contact layer in at least a portion of the first boarder region,
   and wherein the absorbent region and the wound contact layer are detached at least in an area inside a perimeter of the absorbent region.

2. A wound dressing according to claim 1, wherein the wound contact layer has a liquid-distribution region located on the distal surface thereof, such that the absorbent region is located adjacent to the liquid-distribution region.

3. A wound dressing according to claim 1, wherein the absorbent region is attached to the wound contact layer at the perimeter of the absorbent region.

4. A wound dressing according to claim 2,
   wherein the distal surface of the wound contact layer extends beyond a perimeter of the liquid-distribution region to define a second border region, and
   wherein the backing layer is attached to the wound contact layer in at least a portion of the respective first and second border regions.

5. A wound dressing according to claim 4, wherein the first border region surrounds the absorbent region and the second border region surrounds the liquid-distribution region.

6. A wound dressing according to claim 5, wherein the backing layer and the wound contact layer are attached to each other by adhesion in the first and second border regions, so as to encapsulate the absorbent region and the liquid-distribution region.

7. A wound dressing according to claim 1, wherein the plurality of absorbent members are surrounded by a frame.

8. A wound dressing according to claim 1, wherein adjacent absorbent members are separated by a distance of from 0.1 to 5 mm.

9. A wound dressing according to claim 1, wherein each of the absorbent members has cross-section selected from the list consisting of: circular, triangular, square, rectangular, pentagonal, hexagonal, heptagonal, octagonal, nonagonal, decagonal, and combinations of any two or more of the aforesaid.

10. A wound dressing according to claim 9, wherein each of the absorbent members has a substantially hexagonal cross-section.

11. A wound dressing according to claim 1, wherein the absorbent members are arranged in a repeating pattern.

12. A wound dressing according to claim 11, wherein the absorbent members are arranged in a honeycomb pattern.

13. A wound dressing according to claim 1, wherein the absorbent members have a thickness of from 0.1 to 5 mm.

14. A wound dressing according to claim 1, wherein each of the absorbent members comprises, or consists of, an absorbent material.

15. A wound dressing according to claim 14, wherein the absorbent material is selected from the list consisting of a superabsorbent material, fluff pulp, carboxymethylcellulose, alginate, chitosan salt, polyurethane, and combinations of any one or more of the aforesaid.

16. A wound dressing according to claim 15, wherein absorbent material comprises a blend of a superabsorbent material and a fluff pulp.

17. A wound dressing according to claim 3, wherein the liquid-distribution region comprises one or more fenestrations.

18. A wound dressing according to claim 3, wherein the liquid-distribution region comprises a hydrophilic material.

19. A wound dressing according to claim 18, wherein the liquid-distribution region comprises a polyurethane foam.

20. A wound dressing according to claim 1, wherein the wound contact layer has a trilaminate structure.

21. A wound dressing according to claim 1, wherein the wound contact layer comprises one or more perforations.

22. A method of manufacturing a wound dressing comprising the steps of:
   providing a backing layer having a proximal surface facing toward the wound and a distal surface facing away from the wound,
   locating an absorbent region on the proximal surface of the backing layer, such that the proximal surface of the backing layer extends beyond the perimeter of the absorbent region to define a first border region, the absorbent region comprising a plurality of discrete absorbent members;
   providing a wound contact layer having a proximal surface facing toward the wound and a distal surface facing away from the wound;
   locating a liquid-distribution region on the distal surface of the wound contact layer, such that the distal surface of the wound contact layer extends beyond a perimeter of the liquid-distribution region to define a second border region;
   attaching the backing layer and the wound contact layer in at least a portion of the respective first and second border regions such that the absorbent region and the liquid-distribution region are adjacent to each other, and wherein the absorbent region and the liquid-distribution region are detached in the area inside the perimeter of the absorbent region.

23. A wound dressing as claimed in claim 1 for use in absorbing fluid discharged from a physiological target, or for use in stemming a flow of a fluid from a physiological target site.

* * * * *